United States Patent
Hong et al.

(10) Patent No.: US 11,748,999 B2
(45) Date of Patent: Sep. 5, 2023

(54) SYSTEM AND METHOD FOR RECOGNIZING INTERSECTION BY AUTONOMOUS VEHICLES

(71) Applicants: Beijing Jingdong Qianshi Technology Co., Ltd., Beijing (CN); JD.com American Technologies Corporation, Mountain View, CA (US)

(72) Inventors: Soonhac Hong, San Jose, CA (US); Jiejie Zhu, Mercer Island, WA (US)

(73) Assignees: BEIJING JINGDONG QIANSHI TECHNOLOGY CO., LTD., Beijing (CN); JD.COM AMERICAN TECHNOLOGIES CORPORATION, Mountain View, CA (US)

( * ) Notice: Subject to any disclaimer, the term of this patent is extended or adjusted under 35 U.S.C. 154(b) by 467 days.

(21) Appl. No.: 16/927,422

(22) Filed: Jul. 13, 2020

(65) Prior Publication Data
US 2022/0012507 A1 Jan. 13, 2022

(51) Int. Cl.
*G06V 20/56* (2022.01)
*B60W 30/18* (2012.01)
(Continued)

(52) U.S. Cl.
CPC ..... *G06V 20/588* (2022.01); *B60W 30/18154* (2013.01); *G06N 3/04* (2013.01); *B60W 2420/42* (2013.01); *B60W 2552/53* (2020.02)

(58) Field of Classification Search
CPC ............... G06V 20/588; G06V 10/82; B60W 30/18154; B60W 2420/42;
(Continued)

(56) References Cited

U.S. PATENT DOCUMENTS

| 2018/0005079 A1 | 1/2018 | Tosic et al. |
| 2020/0029488 A1 | 1/2020 | Bertucci et al. |

(Continued)

FOREIGN PATENT DOCUMENTS

| CN | 108831168 A | 11/2018 |
| CN | 110874100 A | 3/2020 |

(Continued)

OTHER PUBLICATIONS

Kaming He, Xiangyu Zhang, Shaoqing Ren, Jian Sun, Deep Residual Learning for Image Recognition, 2015, arXiv:1512.03385.
(Continued)

*Primary Examiner* — Adam R Mott
*Assistant Examiner* — Heather J Keniry
(74) *Attorney, Agent, or Firm* — Scully, Scott, Murphy & Presser, P.C.

(57) ABSTRACT

A system and method for autonomous navigation. The system includes a computing device having a processor and a storage device storing computer executable code. The computer executable code, when executed at the processor, is configured to: provide a planned path having intersections in an environment, where the intersections and roads therebetween are represented by sequential place identifications (IDs); receive images of the environment; perform convolutional neural network on the images to obtain predicted place IDs; when a predicted place ID of a current image is next to a place ID of a previous image, and is the same as predicted place IDs of a predetermined number of following images, define the predicted place ID as place IDs of the current and the following images; and perform autonomous navigation based on the planned path and the image place IDs.

20 Claims, 4 Drawing Sheets

(51) Int. Cl.
    *G06N 3/04*     (2023.01)
    *B60W 60/00*     (2020.01)
    *G06N 3/08*     (2023.01)
    *G06V 10/82*     (2022.01)
    *G01C 21/34*     (2006.01)
    *G01C 21/32*     (2006.01)
    *G01C 21/00*     (2006.01)

(58) Field of Classification Search
    CPC .. B60W 2552/53; B60W 60/001; G06N 3/04; G06N 3/0454; G06N 3/08; G01C 21/3415; G01C 21/32; G01C 21/3446; G01C 21/3848
    See application file for complete search history.

(56) References Cited

U.S. PATENT DOCUMENTS

2020/0029490 A1* 1/2020 Bertucci .............. A01B 79/005
2020/0051252 A1* 2/2020 Brown ................ G05D 1/0231
2020/0134313 A1* 4/2020 Endoh .................... G06N 3/084
2020/0160558 A1* 5/2020 Urtasun ............... G06K 9/6248
2020/0247431 A1* 8/2020 Ferencz ............. G01C 21/3658
2021/0056306 A1* 2/2021 Hu ....................... G06K 9/6262

FOREIGN PATENT DOCUMENTS

CN        111179608 A     5/2020
WO     2016022108 A1     2/2016

OTHER PUBLICATIONS

Christian Szegedy, Wei Liu, Yangqing Jia, Pierre Sermanet, Scott Reed, Dragomir Anguelov, Dumitru Erhan, Vincent Vanhoucke, Andrew Rabinovich, Going deeper with convolutions, 2014, arXiv:1409. 4842.

Tang, Y., et al., "Navigation System of Indoor Trackless Inspection Robot Based on Machine Vision", Automation & Instrumentation 2020, 6 pages, 35(8), with English Language abstract.

* cited by examiner

SYSTEM AND METHOD FOR RECOGNIZING INTERSECTION BY AUTONOMOUS VEHICLES

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to the field of autonomous navigation, and more particularly to systems and methods for driving direction by recognizing intersections.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

For autonomous navigation, a global path is generally provided for an autonomous vehicle, which includes routes, intersections on the route, and turning directions at each intersection. Thus, the autonomous vehicle needs to recognize the intersections for following the driving directions at the intersections. Global positioning system (GPS) may be used to recognize an intersection. However, GPS-based intersection recognition does not work well in GPS-denied outdoor environments (e.g. Urban Canyon and tunnel) because GPS signal is not available or very weak.

In GPS-denied outdoor environments, light detection and ranging (LIDAR) has been used for recognizing an intersection. Although LIDAR-based intersection recognition has shown good performance in closed outdoor environments, it has failed in open outdoor environments because of the distance limitation of LIDAR.

Therefore, an unaddressed need exists in the art to address the aforementioned deficiencies and inadequacies.

SUMMARY

In certain aspects, the present disclosure relates to a system for autonomous navigation. In certain embodiments, the system includes a visual sensor and a computing device, and the computing device has a processor and a storage device storing computer executable code. The computer executable code, when executed at the processor, is configured to:

provide a planned path for the autonomous navigation, where the planned path includes multiple intersections in an environment, and the intersections and roads between the intersections are represented by sequential place identifications (IDs) along the path;

receive images of the environment along the planned path captured by the visual sensor, where the images include a current image, a previous image immediately previous to the current image, and a predetermined number of following images immediately after the current image;

perform convolutional neural network on the images to obtain predicted place IDs of the images;

when a predicted place ID of the current image is next to a place ID of the previous image, and is the same as predicted place IDs of the predetermined number of the following images, define the predicted place ID of the current image as place IDs of the current image and the predetermined number of the following images; and perform autonomous navigation based on the planned path and the place IDs of the images.

In certain embodiments, the convolutional neural network is ResNet.

In certain embodiments, the convolutional neural network is trained using labeled images of the environment, and a partial region of at least one of the labeled images is blocked.

In certain embodiments, the predetermined number is in a range of 1-20. In certain embodiments, the predetermined number is three. The predetermined number of images, including the current image, are also named a temporal window.

In certain embodiments, the computer executable code is configured to, when the predicted place ID of the current image is not next to the place ID of the previous image, define the place ID of the current image as the place ID of the previous image.

In certain embodiments, the computer executable code is configured to, when the predicted place ID of the current image is not the same as a predicted place ID of one of the predetermined number of the following images, define the place ID of the current image, the one of the predetermined number of the following images, and images between the current image and the one of the predetermined number of the following images, as the place ID of the previous image. The process may then continue to process the image next to the one of the predetermined number of the following images.

In certain embodiments, the computing device is an embedded device. In certain embodiments, the visual sensor includes an RGB camera, and the images are RGB images. In certain embodiments, the visual sensor includes three RGB cameras installed in front of a vehicle. In certain embodiments, the three RGB cameras are installed in the left side, middle, and the right side. In certain embodiments, the visual sensor may also include one or more RGB-depth (RGB-D) cameras.

In certain aspects, the present disclosure relates to a method for autonomous navigation. In certain embodiments, the method includes:

providing, by a computing device, a planned path for the autonomous navigation, where the planned path includes multiple intersections in an environment, and the intersections and roads between the intersections are represented by sequential place IDs along the path;

receiving, by the computing device, multiple images of the environment along the planned path captured by a visual sensor, where the images include a current image, a previous image immediately previous to the current image, and a predetermined number of following images immediately after the current image;

performing, by the computing device, convolutional neural network on the images to obtain predicted place IDs of the images;

when a predicted place ID of the current image is next to a place ID of the previous image, and is the same as predicted place IDs of the predetermined number of the following images, defining the predicted place ID of the current image as place IDs of the current image and the predetermined number of the following images; and performing, by the computing device, the autonomous navigation based on the planned path and the place IDs of the images.

In certain embodiments, the convolutional neural network is ResNet.

In certain embodiments, the convolutional neural network is trained using labeled images of the environment, and a partial region of at least one of the labeled images is blocked.

In certain embodiments, the predetermined number is in a range of 1-20. In certain embodiments, the predetermined number is three.

In certain embodiments, the method further includes, when the predicted place ID of the current image is not next to the place ID of the previous image, defining the place ID of the current image as the place ID of the previous image.

In certain embodiments, the method further includes, when the predicted place ID of the current image is not the same as a predicted place ID of one of the predetermined number of the following images, defining the place ID of the current image, the one of the predetermined number of the following images, and images between the current image and the one of the predetermined number of the following images, as the place ID of the previous image.

In certain embodiments, the computing device is an embedded device, the visual sensor comprises an RGB camera, and the images are RGB images.

In certain embodiments, the computing device is an embedded device. In certain embodiments, the visual sensor includes an RGB camera, and the images are RGB images. In certain embodiments, the visual sensor includes three RGB cameras installed in front of the vehicle. In certain embodiments, the three RGB cameras are installed in the left side, middle, and the right side. In certain embodiments, the visual sensor may also include one or more RGB-D cameras.

In certain aspects, the present disclosure relates to a non-transitory computer readable medium storing computer executable code. In certain embodiments, the computer executable code, when executed at a processor of a robotic device, is configured to perform the method described above.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
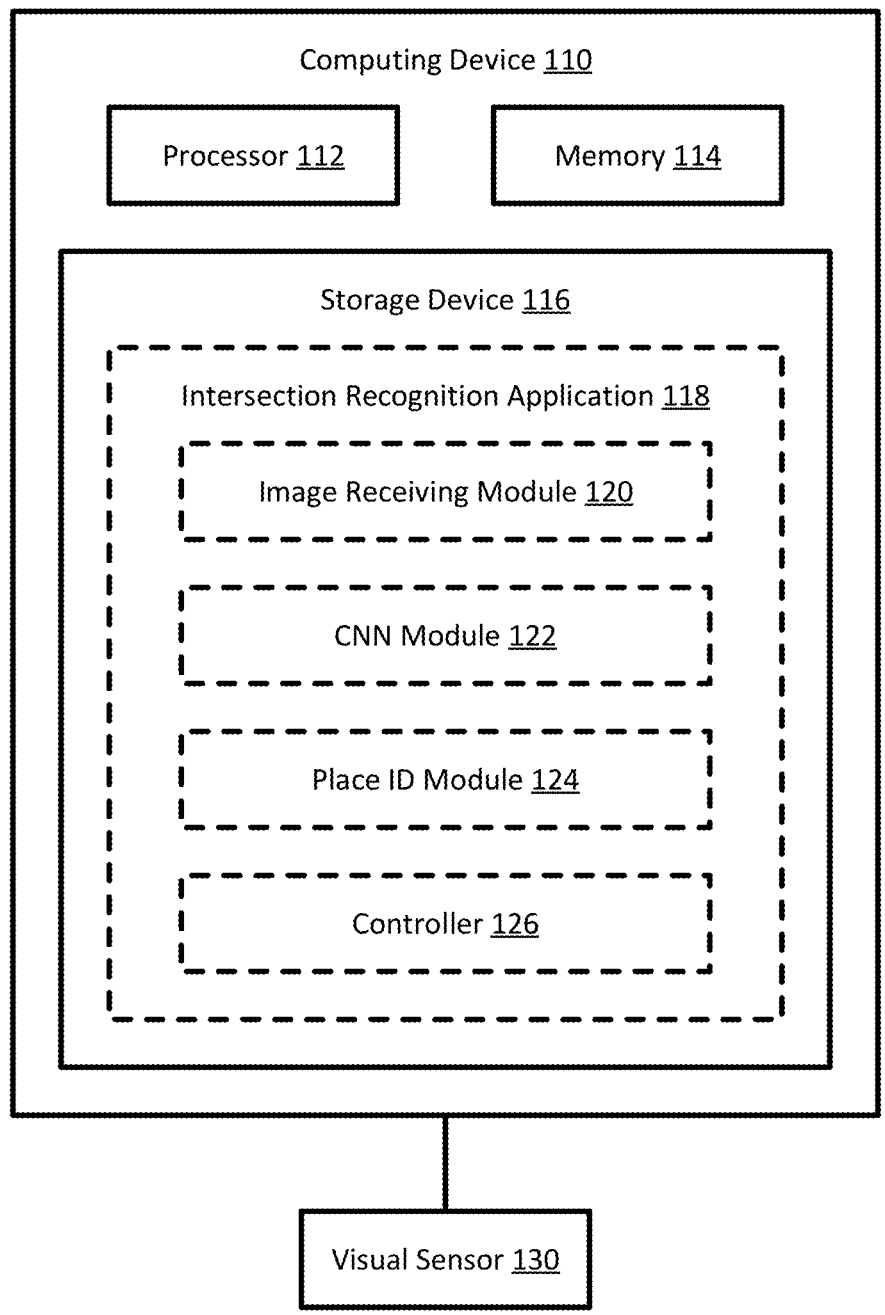
FIG. 1 schematically depicts a system for autonomous navigation according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

FIG. 1 schematically depicts a system for autonomous navigation according to certain embodiments of the present disclosure. As shown in FIG. 1, the system 100 includes a computing device 110 and a visual sensor 130. In certain embodiments, the computing device 110 shown in FIG. 1 may be a server computer, a cluster, a cloud computer, a general-purpose computer, a headless computer, or a specialized computer, which provides navigation service. In certain embodiments, the computing device 110 is a specialized computer or an embedded system which have limited computing power and resources. The computing device 110 may include, without being limited to, a processor 112, a memory 114, and a storage device 116. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

In certain embodiments, the visual sensor 130 includes a camera or other visual sensors, and is configured to capture images or videos of the environment. In certain embodiments, the visual sensor 130 is an RGB camera or an RGB-D camera. In certain embodiments, the visual sensor 130 may also include LIDAR device, gray scale cameras, etc. In certain embodiments, the visual sensor 130 includes three cameras in front of the vehicle, and three images taken by the three cameras at the same time are combined to form one image for further analysis. In certain embodiments, the RGB cameras can take images in a frame rate in a range of, for example, from 8 frames per second (fps) to 1000 fps. In certain embodiments, the RGB cameras take images at 30 fps.

The processor 112 may be a central processing unit (CPU) which is configured to control operation of the computing device 110. In certain embodiments, the processor 112 can execute an operating system (OS) or other applications of the computing device 110. In certain embodiments, the computing device 110 may have more than one CPU as the processor, such as two CPUs, four CPUs, eight CPUs, or any suitable number of CPUs. The memory 114 may be a volatile memory, such as the random-access memory (RAM), for storing the data and information during the operation of the computing device 110. In certain embodiments, the memory 114 may be a volatile memory array. In certain embodiments, the robotic device 110 may run on more than one processor 112 and/or more than one memory 114. The storage device 116 is a non-volatile data storage media or device. Examples of the storage device 116 may include flash memory, memory cards, USB drives, or other types of non-volatile storage devices such as hard drives, floppy disks, optical drives, or any other types of data storage devices. In certain embodiments, the computing device 110 may have more than one storage device 116. In certain embodiments, the computing device 110 may also include a remote storage device 116.

The storage device 116 stores computer executable code. The computer executable code includes an intersection recognition application 118. The intersection recognition application 118 includes the code or instructions which, when executed at the processor 112, may perform autonomous navigation following a planned path. In certain embodiments, as shown in FIG. 1, the intersection recognition application 118 includes, among other things, an image receiving module 120, a convolutional neural network (CNN) module 122, a place identification (ID) module 124, and a controller 126.

The image receiving module 120 is configured to receive or retrieve images captured by the visual sensor 130. In certain embodiments, the image receiving module 120 may be further configured to retrieve configuration information of the visual sensor 130, such as intrinsic parameters and/or extrinsic parameters of the visual sensor 130, and use the parameters to pre-process the received image. The intrinsic parameters may include camera center, distortion correction, and focus length; and the extrinsic parameters may include mounting position and orientation of the visual sensors 130. In certain embodiments, the visual sensors 130 are RGB cameras and the images are RGB image including Red, Green, Blue color channels. In certain embodiments, the visual sensors 130 includes three RGB cameras installed in the front of the vehicle and configured to capture left, middle and right of the front view, the three views have partial overlaps, and the image receiving module 120 may combine three images from the three cameras captured at the same time into one image. After obtaining the sequential images, the image receiving module 120 is further configured to send the images to the CNN module 122. The image receiving module 120 may send the images one by one, or by batch.

The CNN module 122 is configured to, upon receiving the images, perform CNN on each of the images to obtain a predicted place ID for each of the images, and send the IDs to the place ID module 124. In certain embodiments, the CNN module 122 may have the structure of ResNet, GoogLeNet, ZFNet, VGGNet, AlexNet, LeNet. In certain embodiments, the CNN module 122 uses ResNet (arXiv: 1512.03385v1, 2015, which is incorporated herein by reference in its entirety) or GoogLeNet (arXiv: 1409.4842v1, 2014, which is incorporated herein by reference in its entirety) to perform the CNN on the images.

In certain embodiments, the CNN module 122 is well trained by a high performance computing device, and is then installed to the computing device 110. The training of the CNN module 122 may be performed using a large number of images of an environment. The environment includes multiple intersections. The images of each intersection is labeled with a specific place ID ($P_{ID}$) corresponding to that intersection. For example, if there are 100 intersections, the images for the 100 intersections may be respectively labeled by 0 to 99, i.e., $P_{ID-0}$ to $P_{ID-99}$. Since each intersection may have multiple images, the multiple images are labeled with the same $P_{ID}$. Further, the images between the intersections, which do not include significant feature of any intersections, are labeled unknown, i.e., $P_{ID-unknown}$. In certain embodiments, instead of being labeled $P_{ID-unknown}$, the images may also be labeled by the two intersections. For example, two neighboring intersections 0 and 1 can be directly connected to each other without any intermediate intersections. The images showing the scene between the intersections 0 and 1 can be labeled in regard to 0 and 1. When a vehicle using one or more front cameras to capture images, the images taken when the vehicle is driven from the intersection 0 to the intersection 1 are different from the images when the vehicle is driven from the intersection 1 to the intersection 0. The images captured when the vehicle is driven from the intersection 0 to the intersection 1 are labeled and the images captured when the vehicle is driven from the intersection 1 to the intersection 0 are labeled $P_{ID-[1-0]}$. By the above labeling of the images between intersections, even if none of the intersections are in the view of certain images, relatively accurate location and driving direction of the vehicle can still be determined based on those images.

As described above, when the well trained CNN module 122 is installed in the computing device 110, it can be used to provide predicted place ID labels for the captured images, and send the predicted place IDs to the place ID module 124. Kindly note the correct place ID determined by the place ID module 124 are trustworthy, but may not be without error. Under rare conditions, the correct ID confirmed by the place ID module 124 may not be the ground truth place ID.

The place ID module 124 is configured to, upon receiving the predicted place ID of a current image, determine if the predicted place ID is correct, provide the correct place ID to the current image, and send the correct place ID of the current image to the controller 126.

In certain embodiments, when the place ID module 124 receives the predicted place ID of the current image, the place ID module 124 determines whether the predicted place ID of the current image is the same as the place ID of the immediate previous image. If the predicted place ID of the current image is the same as the place ID of the immediate previous image, the place ID module 124 confirms the predicted place ID of the current image as the place ID of the current image. If the predicted place ID of the current image is not the same as the place ID of the immediate previous image, the place ID module 124 performs a method to further determine the place ID of the current image. In certain embodiments, the situation that the predicted ID of the current image is the same as the place ID of the previous image is also included in the method described in the following FIG. 2.

Figure 2:
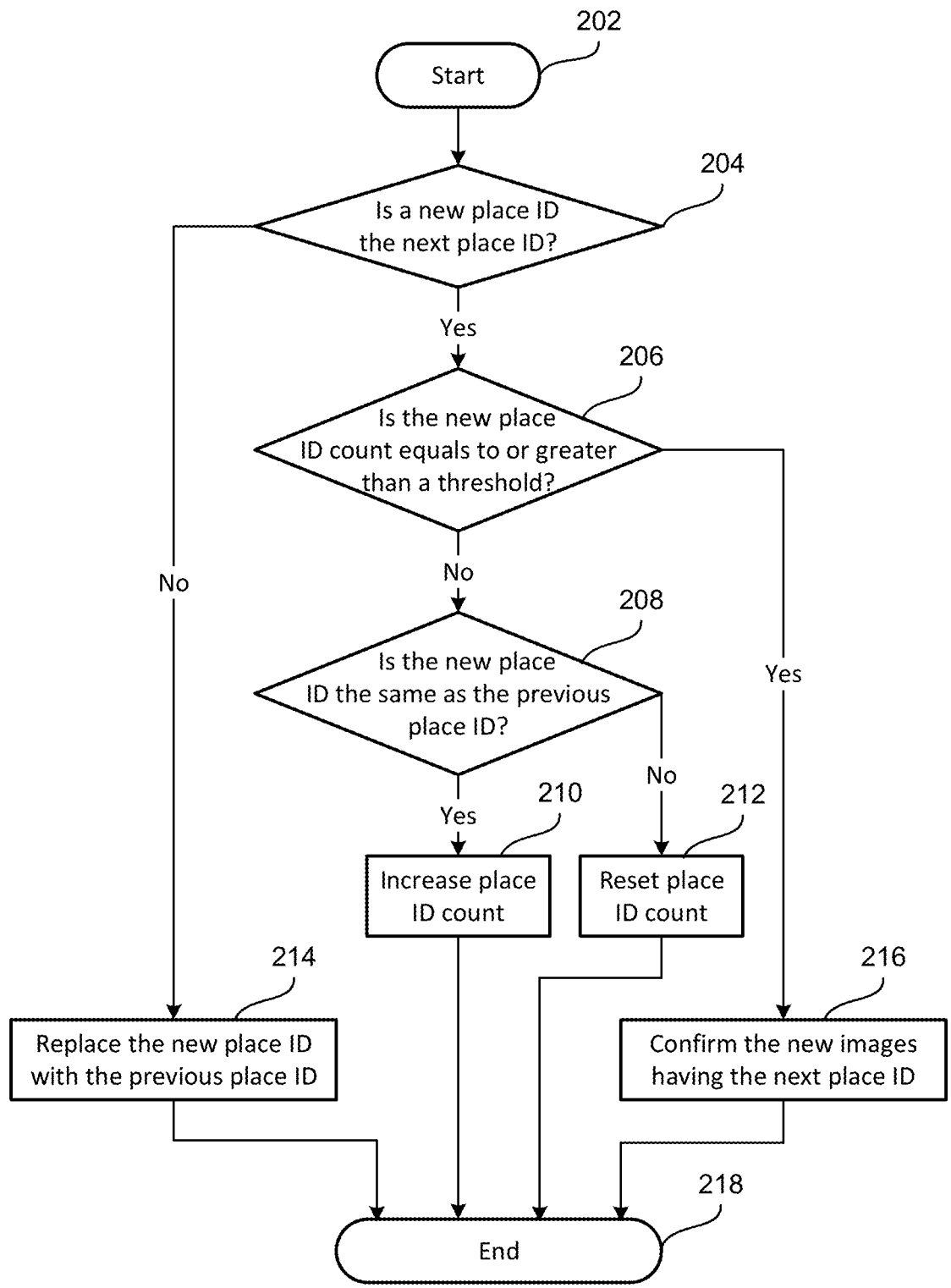
FIG. 2 schematically depicts a method of determining place ID of an image based on predicted place ID according to certain embodiments of the present disclosure.

FIG. 2 schematically depicts a method of determining place ID of the current image based on the predicted place ID according to certain embodiments of the present disclosure. The method starts at procedure 202 when the place ID module 124 receives the predicted place ID for the current image. The process from start 202 to end 218 is performed for each new image.

At procedure 204, after receiving the predicted place ID for the current image, the place ID module 124 first determines whether the predicted place ID of the current image is the next place ID in the planned path. Assume that the planned path includes n+1 sequential intersections 0, 1, 2, . . . , (i−1), i, (i+1), . . . , (n−1), n, the autonomous vehicle is planned to be driven from the starting point of intersection 0 to the destination intersection N, the labels of the images captured by the vehicle are supposed to be $P_{ID-0}$, $P_{ID-[0-1]}$, $P_{ID-1}$, $P_{ID-[1-2]}$, $P_{ID-2}$, . . . , $P_{ID-(i-1)}$, $P_{ID-[(i-1)-i]}$, $P_{ID-i}$, $P_{ID-[i-(i+1)]}$, $P_{ID-(i+1)}$, . . . , $P_{ID-(n-1)}$, $P_{ID-[(n-1)-n]}$, $P_{ID-n}$. Here we denote the place ID of the immediate previous image is $P_{ID-[(i-1)-i]}$, then the upcoming or the next place ID in the path should be $P_{ID-i}$. Therefore, when the predicted place ID for the current image is the next place ID, i.e., $P_{ID-i}$, the process proceeds to procedure 206. Otherwise, if the predicted place ID for the current image is not the next place ID, which could be $P_{ID-[(i-1)-i]}$ or any place ID other than $P_{ID-[(i-1)-i]}$ or $P_{ID-i}$, the process proceeds to procedure 214. At procedure 214, the place ID module 124 defines the place ID of the current image as $P_{ID-[(i-1)-i]}$, end the process proceeds at procedure 218, and then starts the process again at procedure 202 to process the next image.

When the predicted place ID of the current image is the next place ID, i.e., $P_{ID-i}$ (next to $P_{ID-[(i-1)-i]}$), the initialized place ID count or the reset ID count in any previous steps should be 0. At procedure 206, the method compares the count C with a threshold $C_{threshold}$. In certain embodiments, the value of the $C_{threshold}$ in a range of 2-50, or 2-30, or 2-20. In certain embodiments, the value of $C_{threshold}$ is in a range of 2-10. In certain embodiments, the value of $C_{threshold}$ is in a range of 2-5. In certain embodiments, the value of $C_{threshold}$ is three, which corresponds to a situation that five sequential images having the predicted next place ID are required to confirm the next place ID as the place ID of the five images. When the count $C<C_{threshold}$, the process proceeds to procedure 208, and when the count $C \geq C_{threshold}$ (or simply $C=C_{threshold}$), the place ID module 124 proceeds to procedure 216.

When the count $C<C_{threshold}$, at procedure 208, the place ID module 124 determines if the predicted place ID of the current image is the same as the predicted place ID of the previous image (or the place ID of the previous image). If the same, the method proceeds to procedure 210, and if not, the method proceeds to procedure 212.

At procedure 210, when the predicted place ID of the current image is the same as the predicted place ID of the previous image, the place ID count is increased by 1, and the method proceeds to procedure 218.

At procedure 212, when the predicted ID of the current image is not the same as the place ID of the previous image or the predicted place ID of the previous image, the method reset place ID count as 0 and proceeds to the procedure 218. Here the procedure 212 may further includes defining the place ID of the current image as the previous place ID, or defining the place ID of a few images in the temporal window that have been processed as the previous place ID.

At procedure 214, when the new place ID is not the next place ID, the method replaces the predicted new place ID with the place ID of the previous image (i.e., the previous place ID), set the previous place ID as the place ID of the current image, and ends the process at procedure 218.

At procedure 216, when the new place ID count equals to (or greater than) the threshold, the method sets the place ID of the (threshold number+2) number of previous images as the next place ID, and ends the process at procedure 218.

At procedure 218, the process is ended for the current image, and the next image is inputted for being processed from the procedure 202.

In one example, $C_{threshold}=3$, and there are eight sequential images −3, −2, −1, 0, 1, 2, 3, 4. The previous images −3, −2, −1 have the place ID $P_{ID[(i-1)-i]}$, the current image 0 and the next four images 1, 2, 3 and 4 all have the predicted place ID $P_{ID-i}$. For the image 0, at procedure 202, the process starts. At procedure 204, since the predicted place ID of the image 0 $P_{ID-i}$ is the place ID next to $P_{ID[(i-1)-i]}$ in the planned path, the process proceeds to procedure 206. At procedure 206, the place ID count, which is an initialized or reset value of 0, is smaller than 3, the $C_{threshold}$, and the process proceeds to procedure 208. At procedure 208, the predicted place ID $P_{ID-i}$ of the image 0 is not the same as that of the previous place ID $P_{ID-[(i-1)-i]}$, and the process proceeds to procedure 212. At procedure 212, the place ID count is reset to 0, and then at procedure 218 the process ends.

Subsequently, the process starts at procedure 202 with the next image, image 1. At procedure 204, the predicted place ID of the image 1 is $P_{ID-i}$, which is the place ID next to $P_{ID[(i-1)-i]}$, and the process proceeds to procedure 206. Kindly note place ID for image 0 is not confirmed yet and the next place ID is determined relative to the place ID $P_{ID[(i-1)-i]}$ of the image −1. At procedure 206, the place ID count, which is 0, is smaller than 3, and the process proceeds to procedure 208. At procedure 208, the predicted place ID $P_{ID-i}$ of the image 1 is the same as the previous place ID, that is, the predicted place ID $P_{ID-i}$ of the previous image, image 0, and the process proceeds to procedure 210. In other words, here the comparison is between the current image and the immediately previous image, no matter whether the previous image has a confirmed place ID or a predicted place ID. At procedure 210, the place ID count is increased by 1, and equals to 1 now, and then at procedure 218 the process ends.

Then, the process starts at procedure 202 with the next image, image 2. At procedure 204, the predicted place ID of the image 2 is $P_{ID-i}$, which is the place ID next to $P_{ID[(i-1)-i]}$, and the process proceeds to procedure 206. At procedure 206, the place ID count, which is 1, is smaller than 3, and the process proceeds to procedure 208. At procedure 208, the predicted place ID $P_{ID-i}$ of the image 2 is the same as the previous place ID, that is, the predicted place ID $P_{ID-i}$ of the previous image, image 1, and the process proceeds to procedure 210. At procedure 210, the place ID count is increased by 1, and equals to 2 now, and at procedure 218 the process ends. Similarly, for image 3, the place ID count is increased to 3.

At last, the process starts at procedure 202 with the next image, image 4. At procedure 204, the predicted place ID of the image 4 is $P_{ID-i}$, which is the place ID next to $P_{ID-[(i-1)-i]}$, of the image −1, and the process proceeds to procedure 206. At procedure 206, the place ID count, which is 3, equals to the threshold 3, and the process proceeds to procedure 216. At procedure 216, the procedure confirms and defines that the place IDs of the images 0-4 are all the predicted place ID $P_{ID-i}$, and the process ends.

The procedure continues. When an image 5 also has the predicted place ID $P_{ID-i}$, at procedure 204, since the predicted place ID $P_{ID-i}$ is not the next place ID relative to the place ID of the image 4, the procedure proceeds to the step 214, where the procedure defines the place ID of the image 5 as the previous place ID, that is, the place ID $P_{ID-i}$ of the image 4.

By this type of design, the predicted place ID is confirmed only if the predicted IDs of a certain number of sequential images are the same and are the next place ID.

In another example, $C_{threshold}=3$, there are eight sequential images −3, −2, −1, 0, 1, 2, 3, 4. The previous images −3, −2, −1 have the place ID $P_{ID[(i-1)-i]}$, the images 0, 1, 2, 3 all have the predicted place ID $P_{ID-i}$, but the image 4 has the predicted place ID other than the predicted place ID $P_{ID-i}$. Under this situation, since the place ID of the image 4 is not the next place ID, the process proceeds to procedure 214, and the place ID of the images 0-4 are set as place ID $P_{ID-[(i-1)-i]}$.

In yet another example, $C_{threshold}=3$, there are eight sequential images −3, −2, −1, 0, 1, 2, 3, 4. The previous images −3, −2, −1 have the place ID $P_{ID-[(i-1)-i]}$, the images 0, 1, 3, 4 all have the predicted place ID $P_{ID-i}$, but the image 2 has the predicted place ID other than the predicted place ID $P_{ID-i}$. Under this situation, since the place ID of the image 2 is not the next place ID, the process proceeds to procedure 214, and the place ID of the images 0-2 are set as place ID $P_{ID-[(i-1)-i]}$. The process then restarts from the procedure 202 for the image 3. If the images 3, 4, 5, 6, 7 all have the predicted place ID $P_{ID-i}$, they will be designated with the place ID $P_{ID-i}$.

The determination of place ID for the captured images are not limited to the embodiments shown in FIG. 2, and any other variations having the similar concept can be used. For example, after determining that the first image having the next place ID at procedure 204, it may not be necessary to compare the place ID count with the threshold count, because generally the threshold count is set to be greater than 0. In another example, after determining that the current image has predicted place ID the next to the previous place ID, the method may process a batch of the following images ($C_{threshold}$+1 number of images following the current image) instead of process the following images one by one. In a further example, the step 212 to reset the place ID count to 0 may not be necessary. Instead, the disclosure can initialize the place ID count as 0 at the begging of the application, and reset the place ID count at procedure 216 after setting place ID for a number of images.

In certain embodiments, the (threshold+2) number of images are needed for defining a new place ID, and the (threshold+2) number of consecutive images are also called a temporal window. The temporal window includes the current image and $C_{theshold}$-+1 number of images following the current image. The next place ID is set only if the predicted place ID for all the images in the temporal window is the next place ID. By this type of design, accurate prediction of place ID is ensured. Further, as a result, instead of defining a place ID for one image and sending the place ID to the controller 126, the place ID module 124 may define place ID for multiple images and send the place ID for the multiple images to the controller 126 as a batch. The number of images in the batch could be any positive integer number from 2 to the $C_{threshold}$+2. Further, by the variation of the embodiment shown in FIG. 2, the temporal window may include $C_{threshold}$ number, $C_{threshold}$+1 number, or $C_{threshold}$+2 number of images. Under all these situations, the process needs to check the predicted place IDs of all the images in a temporal window to confirm a place ID increase from the previous place ID. In certain embodiments, the temporal window preferably includes 2-10 images. In certain embodiments, the temporal window includes 3, 4 or 5 images.

Referring back to FIG. 1, the controller 126 is configured to, upon receiving the placed ID or place IDs of one or more images from the place ID module 124, record the place IDs of the images, compare the place IDs with the planned path, and control the operations of the vehicle based on the result.

In certain aspects, the present related to a method for training the CNN module 122. In certain embodiments, the CNN module 122 is trained using a high performance computing device other than the computing device 110, and the well trained CNN module 122 can then be transferred to the computing device 110. By this type of design, there is not much computational needs for the computing device 110, which could reduce the cost of the vehicle equipped with the computing device 110.

Figure 3:
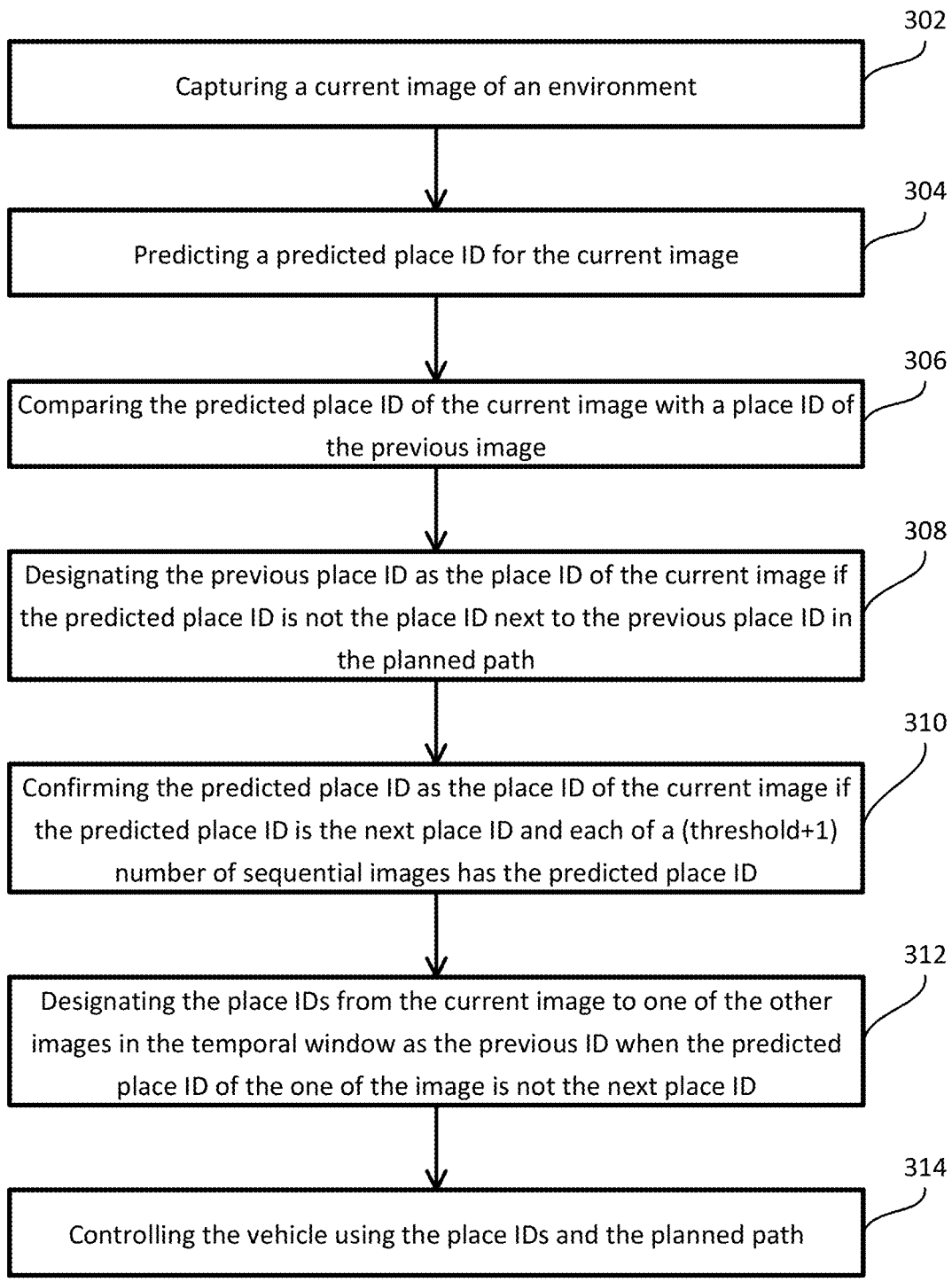
FIG. 3 schematically depicts a method for autonomous navigation according to certain embodiments of the present disclosure.

In certain aspects, the present disclosure relates to a method for driving direction using intersection recognition. FIG. 3 schematically depicts a method for autonomous navigation according to certain embodiments of the present disclosure. In certain embodiments, the method 300 as shown in FIG. 3 may be implemented on a computing device 110 as shown in FIG. 1. It should be particularly noted that, unless otherwise stated in the present disclosure, the steps of the method may be arranged in a different sequential order, and are thus not limited to the sequential order as shown in FIG. 3.

At procedure 302, the image receiving module 120 instructs the visual sensor 130 to capture images of the environment, receives the images from the visual sensor 130, and sends the captured images to the CNN module 122. In certain embodiments, the visual sensor 130 includes three cameras installed in the front of a vehicle, taking images of the left, middle and right in front of the vehicle, and three images from the three cameras taken at the same time are combined as one image. In certain embodiments, a synchronization mechanism is provided for the three cameras.

At procedure 304, upon receiving a current image, the CNN module 122 performs CNN on the current images to obtain a predicted place ID for the current image, and sends the predicted place ID of the images to the place ID module 124. In certain embodiments, the CNN module 122 may perform the CNN on the images one by one, and send the predicted place ID one by one. In certain embodiments, the CNN module 122 may perform the CNN on the images by batches, the images in each batch is processed in sequence or in parallel, and the prediction results for the batch is sent to the place ID module 124.

At procedure 306, upon receiving the predicted place ID of the current image, the place ID module 124 compares the predicted ID with the place ID of the immediately previous image.

At procedure 308, when the predicted place ID of the current image is the same as the place ID of the immediately previous image (previous place ID), the place ID module 124 confirms that the predicted place ID of the current image is the place ID of the current image, sends the place ID for the current image to the controller 126, and proceeds to process the next image based on the predicted place ID of the next image; or if the predicted place ID of the current image is different from the previous place ID, but the predicted ID is not the next place ID that is next to the previous place ID in the planned path, the place ID module 124 would replace the predicted place ID of the current image with the previous place ID, sends the previous place ID for the current image to the controller 126, and proceeds to process the next image based on the predicted place ID of the next image.

At procedure 310, when the predicted place ID of the current image is the next place ID that is next to the previous place ID in the planned path, the place ID module 124 processes multiple images in a temporal window. The temporal window includes a (threshold+1) number of sequential images including and starting from the current image. In certain embodiments, the threshold number is in a range of 1-50, or 1-30, or 1-20, or 1-10, or 1-5. In certain embodiments, the threshold number is three. If predicted place ID for each of the (threshold+1) number of images in the temporal window is the next place ID, the place ID module 124 confirms that the predicted ID (the next place ID) is the place ID for each of the threshold number of images, and sends the place IDs of the threshold number of images to the controller 126. In certain embodiments, the threshold number may be defined slightly differently, so that the threshold number is the image numbers in the temporal window. One implementation of the procedure, for example, is to increase the place ID count by 1 for each of the checked image that has the predicted next place ID, and compare the place ID count to the threshold immediately after each place ID count increase.

At procedure 312, when the predicted place ID of the current image is the next place ID, but the predicted place ID of one of the other images in the temporal window is not the next place ID, the place ID module 124 designates the place IDs from the current image to the one of the other images as the previous place ID, sends the designated place IDs to the controller 126, and starts processing the next image next to the one of the other images.

At procedure 314, upon receiving the place IDs of the images, the controller 126 uses the place IDs and the planned path to control the operation of the vehicle.

In the above embodiments, the planned path includes sequential place ID labels of be $P_{ID\text{-}0}$, $P_{ID\text{-}[0\text{-}1]}$, $P_{ID\text{-}1}$, $P_{ID\text{-}[1\text{-}2]}$, $P_{ID\text{-}2}$, . . . , $P_{ID\text{-}(i\text{-}1)}$, $P_{ID\text{-}[(i\text{-}1)\text{-}i]}$, $P_{ID\text{-}i}$, $P_{ID\text{-}[i\text{-}(i+1)]}$, $P_{ID\text{-}(i+1)}$, . . . , $P_{ID\text{-}(n-1)}$, $P_{ID\text{-}[(n-1)\text{-}n]}$, $P_{ID\text{-}n}$. In certain embodiments, the present disclosure may also define scenes between any of the two intersections as unknown. Accordingly, the place ID labels in a planned path containing intersections 0 to n could be: be $P_{ID\text{-}0}$, $P_{unknown}$, $P_{ID\text{-}1}$, $P_{unknown}$, $P_{ID\text{-}2}$, . . . , $P_{ID\text{-}(i-1)}$, $P_{unknown}$, $P_{ID\text{-}i}$, $P_{unknown}$, $P_{ID\text{-}(i+1)}$, . . . , $P_{ID\text{-}(n-1)}$, $P_{unknown}$, $P_{ID\text{-}n}$. The method for autonomous navigation of the vehicle is similar to that shown in FIG. 3. The differences includes, for example, in addition to confirming the predicted place IDs as the place IDs of the threshold number of images if the predicted place IDs of the threshold number of images are all the next place ID at procedure 310, the place ID module 124 can also confirm the predicted place IDs as the place IDs of the threshold number of images if the predicted place IDs of the threshold number of images are all unknown and are different from the previous ID. By this type of design, there is no need to differentiate the scene of the roads between different intersections. As a result, the need for computational power may be less demanding, and the cost of the computing device 110 may be further reduced.

FIGS. 4A-4D schematically show an implementation of an autonomous navigation system according to certain embodiments of the present disclosure. In the embodiments, a convolutional neural network 420 is the central part, and the disclosure includes a training phase to train the convolutional neural network 420 and a prediction phase to predict place ID for each intersection and provide a corresponding driving direction.

Figure 4A:
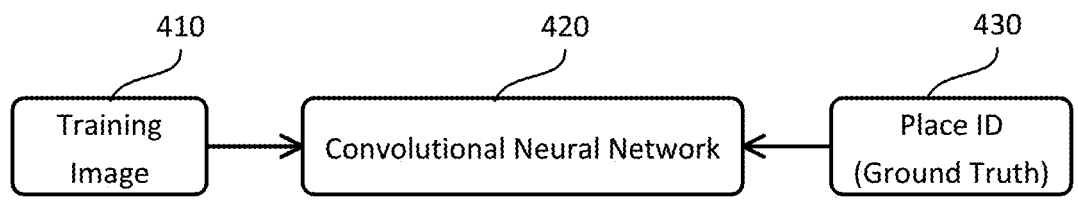
FIG. 4A schematically depicts training of a convolutional neural network according to certain embodiments of the present disclosure.
Figure 4B:
FIG. 4B and FIG. 4C schematically depict expanding of training dataset by adding random blocks.
Figure 4C:
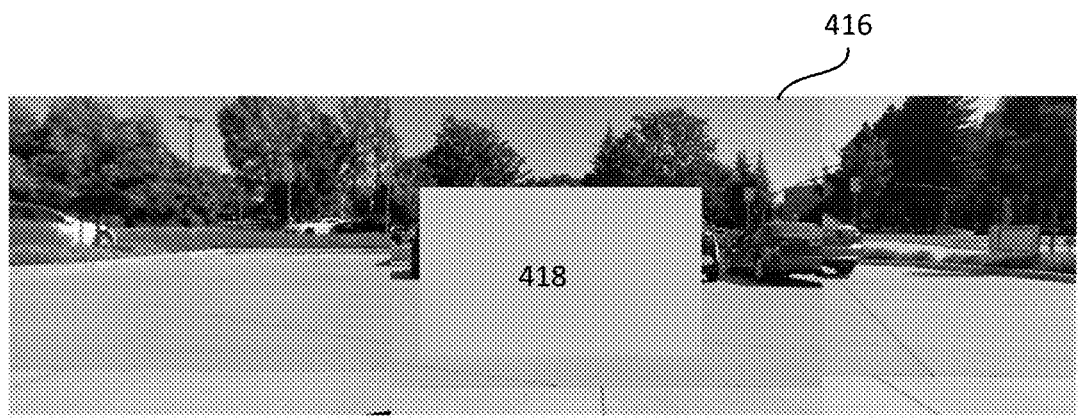

FIG. 4A schematically shows training of the convolutional neural network 420 using training images 410 and ground truth place IDs of the training images 410. FIG. 4B schematically shows expanding of the training dataset by adding a random block 414 onto a training image 412, and FIG. 4C schematically shows expanding of the training dataset by adding a random blocks 418 onto another training image 416. Kindly note each of the training image 412 and 416 is a combination of three RGB images taken by three RGB cameras installed in left, middle, and right sides in the front of the vehicle at the same time. In certain embodiments, for training the convolutional neural network, color images are collected around each intersection and along a path between any two intersections with different weathers and viewpoints. Each color image is labeled with a place ID. Place ID is generated from the start point to the goal point sequentially. Color images collected along the path between two intersections are labeled as unknown place ID, or alternatively, by the two intersections. Given color images with place IDs, the convolutional neural network 420 is trained using supervised learning. In certain embodiments, as shown in FIG. 4B and FIG. 4C, to simulate the situation that an object is close to the camera and may block partial view of the camera, additional training dataset with random blocks 414 or 418 is generated. The training dataset with random blocks makes the convolutional neural network 420 robust for intersection recognition when an object is close to the camera and blocks partial view of the camera.

Figure 4D:
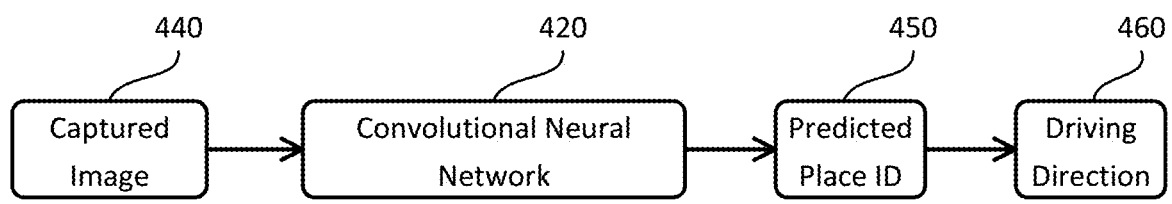
FIG. 4D schematically depicts using a well-trained convolutional neural network to predict place ID according to certain embodiments of the present disclosure.

After the convolutional neural network 420 is well trained, as shown in FIG. 4D, the convolutional neural network 420 can be used to process the captured images 440 to predict place IDs for the captured images 440. Then the vehicle can be controlled or directed based on the predicted place IDs and the planned path. In certain embodiments, the training of the convolutional neural network 420 is performed on a high performance computing device, such as a computer server, and the well trained convolutional neural network 420 can be used by a specialized computing devices, such as an embedded system, to direct the driving of the vehicle. In this prediction phase, the convolutional neural network predicts a place ID for a new image. Specifically, the convolutional neural network 420 takes a color image as an input and computes probability of the input image to each place ID. A place ID with the highest probability is selected as the predicted place ID.

After the prediction, referring back to FIG. 2, the predicted place ID is checked with place ID sequence (planned path) and a temporal window to reduce a false prediction. First, place ID sequence is used to generate a robust place ID. A new place ID should be the next place ID or the unknown place ID because the autonomous vehicle is supposed to move to the next place ID only along path determined by the global planner. If the new place ID is not the next place ID or the unknown place ID, the disclosure replaces the new place ID with the previous place ID. In addition, the disclosure uses, for example, three consecutive place IDs for the temporal window. A new place ID should be constant in three consecutive images. If a place ID is not constant in three consecutive images, the disclosure may replace the new place ID with the previous place ID.

In a further aspect, the present disclosure is related to a non-transitory computer readable medium storing computer executable code. The code, when executed at a processor 112 of the computing device 110, may perform the methods 300 as described above. In certain embodiments, the non-transitory computer readable medium may include, but not limited to, any physical or virtual storage media. In certain embodiments, the non-transitory computer readable medium may be implemented as the storage device 116 of the computing device 110 as shown in FIG. 1.

In certain aspects, the present disclosure provides a learning-based intersection recognition to allow an autonomous vehicle to recognize intersections and to follow a driving direction at each intersection. In certain embodiments, color images are used in the learning-based algorithm, which works well in GPS denied outdoor environments as well as open outdoor environment. The learning-based intersection is robust on environment changes and viewpoints because the algorithm can be trained efficiently with various images around each of the intersections.

In summary, certain embodiments of the present disclosure, among other things, have the following beneficial advantages. First, the disclosure provides a system and method for autonomous navigation, where intersections in the planned path can be determined using place IDs of the visual images. Second, the place IDs of the images are analyzed by convolutional neural network, which provides accurate prediction result. Third, by setting up a temporal window, the place IDs of the visual images can be robustly determined based on predicted place IDs of several sequential images. Fourth, training images are expanded by adding random blocks, which makes the training aligned well with practical application, where objects may block the captured images.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system for autonomous navigation, comprising a visual sensor and a computing device, wherein the computing device comprises a processor and a storage device storing computer executable code, and the computer executable code, when executed at the processor, is configured to:
   provide a planned path for the autonomous navigation, wherein the planned path comprises a plurality of intersections in an environment, and the intersections and roads between the intersections are represented by sequential place identifications (IDs) along the path;
   receive a plurality of images of the environment along the planned path captured by the visual sensor, wherein the plurality of images comprises a current image, a previous image immediately previous to the current image, and a predetermined number of following images immediately after the current image;
   perform convolutional neural network on the plurality of images to obtain a plurality of predicted place IDs of the plurality of images;
   when a predicted place ID of the current image is next to a place ID of the previous image, and is the same as predicted place IDs of the predetermined number of the following images, define the predicted place ID of the current image as place IDs of the current image and the predetermined number of the following images;
   when the predicted place ID of the current image is not next to the place ID of the previous image, define the place ID of the current image as the place ID of the previous image; and
   perform autonomous navigation based on the planned path and the place IDs of the plurality of images,
   wherein the performing convolutional neural network on the plurality of images to obtain a plurality of predicted place IDs of the plurality of images comprises: taking each of the plurality of images as an input image of the convolutional neural network, computing a probability of the input image to each place ID, and selecting a place ID with the highest probability as a predicted place ID of the input image, so as to obtain the plurality of predicted place IDs of the plurality of images.

2. The system of claim 1, wherein the convolutional neural network is Residual Network (ResNet).

3. The system of claim 1, wherein the convolutional neural network is trained using a plurality of labeled images of the environment, and a partial region of at least one of the labeled images is blocked.

4. The system of claim 1, wherein the predetermined number is in a range of 1-20.

5. The system of claim 4, wherein the predetermined number is three.

6. The system of claim 1, wherein the computer executable code is configured to, when the predicted place ID of the current image is not the same as a predicted place ID of one of the predetermined number of the following images, define the place ID of the current image, the one of the predetermined number of the following images, and images between the current image and the one of the predetermined number of the following images, as the place ID of the previous image.

7. The system of claim 1, wherein the computing device is an embedded device.

8. The system of claim 1, wherein the visual sensor comprises a red, green, blue (RGB) camera, and the images are RGB images.

9. The system of claim 8, wherein the visual sensor comprises three RGB cameras installed in front of a vehicle.

10. A method for autonomous navigation, comprising:
   providing, by a computing device, a planned path for the autonomous navigation, wherein the planned path comprises a plurality of intersections in an environment, and the intersections and roads between the intersections are represented by sequential place identifications (IDs) along the path;
   receiving, by the computing device, a plurality of images of the environment along the planned path captured by a visual sensor, wherein the plurality of images comprises a current image, a previous image immediately previous to the current image, and a predetermined number of following images immediately after the current image;
   performing, by the computing device, convolutional neural network on the plurality of images to obtain a plurality of predicted place IDs of the plurality of images;
   when a predicted place ID of the current image is next to a place ID of the previous image, and is the same as predicted place IDs of the predetermined number of the following images, defining the predicted place ID of the current image as place IDs of the current image and the predetermined number of the following images;
   when the predicted place ID of the current image is not next to the place ID of the previous image, defining the place ID of the current image as the place ID of the previous image; and
   performing, by the computing device, the autonomous navigation based on the planned path and the place IDs of the plurality of images,
   wherein the performing convolutional neural network on the plurality of images to obtain a plurality of predicted place IDs of the plurality of images comprises: taking each of the plurality of images as an input image of the convolutional neural network, computing a probability of the input image to each place ID, and selecting a place ID with the highest probability as a predicted place ID of the input image, so as to obtain the plurality of predicted place IDs of the plurality of images.

11. The method of claim 10, wherein the convolutional neural network is ResNet.

12. The method of claim 10, wherein the convolutional neural network is trained using a plurality of labeled images of the environment, and a partial region of at least one of the labeled images is blocked.

13. The method of claim 10, wherein the predetermined number is in a range of 1-20.

14. The method of claim 10, further comprising, when the predicted place ID of the current image is not the same as a predicted place ID of one of the predetermined number of the following images, defining the place ID of the current image, the one of the predetermined number of the following images, and images between the current image and the one of the predetermined number of the following images, as the place ID of the previous image.

15. The method of claim 10, wherein the computing device is an embedded device, the visual sensor comprises an RGB camera, and the images are RGB images.

16. A non-transitory computer readable medium storing computer executable code, wherein the computer executable code, when executed at a processor of a robotic device, is configured to:
provide a planned path for autonomous navigation, wherein the planned path comprises a plurality of intersections in an environment, and the intersections and roads between the intersections are represented by sequential place identifications (IDs) along the path;
receive a plurality of images of the environment along the planned path captured by a visual sensor, wherein the plurality of images comprises a current image, a previous image immediately previous to the current image, and a predetermined number of following images immediately after the current image;
perform convolutional neural network on the plurality of images to obtain a plurality of predicted place IDs of the plurality of images;
when a predicted place ID of the current image is next to a place ID of the previous image, and is the same as predicted place IDs of the predetermined number of the following images, define the predicted place ID of the current image as place IDs of the current image and the predetermined number of the following images;
when the predicted place ID of the current image is not next to the place ID of the previous image, define the place ID of the current image as the place ID of the previous image; and
perform autonomous navigation based on the planned path and the place IDs of the plurality of images,
wherein the performing convolutional neural network on the plurality of images to obtain a plurality of predicted place IDs of the plurality of images comprises: taking each of the plurality of images as an input image of the convolutional neural network, computing a probability of the input image to each place ID, and selecting a place ID with the highest probability as a predicted place ID of the input image, so as to obtain the plurality of predicted place IDs of the plurality of images.

17. The non-transitory computer readable medium of claim 16, wherein the computer executable code is configured to, when the predicted place ID of the current image is not the same as a predicted place ID of one of the predetermined number of the following images, define the place ID of the current image, the one of the predetermined number of the following images, and images between the current image and the one of the predetermined number of the following images, as the place ID of the previous image.

18. The non-transitory computer readable medium of claim 16, wherein the convolutional neural network is ResNet.

19. The non-transitory computer readable medium of claim 16, wherein the convolutional neural network is trained using a plurality of labeled images of the environment, and a partial region of at least one of the labeled images is blocked.

20. The non-transitory computer readable medium of claim 16, wherein the predetermined number is three.

* * * * *